Figure 1:
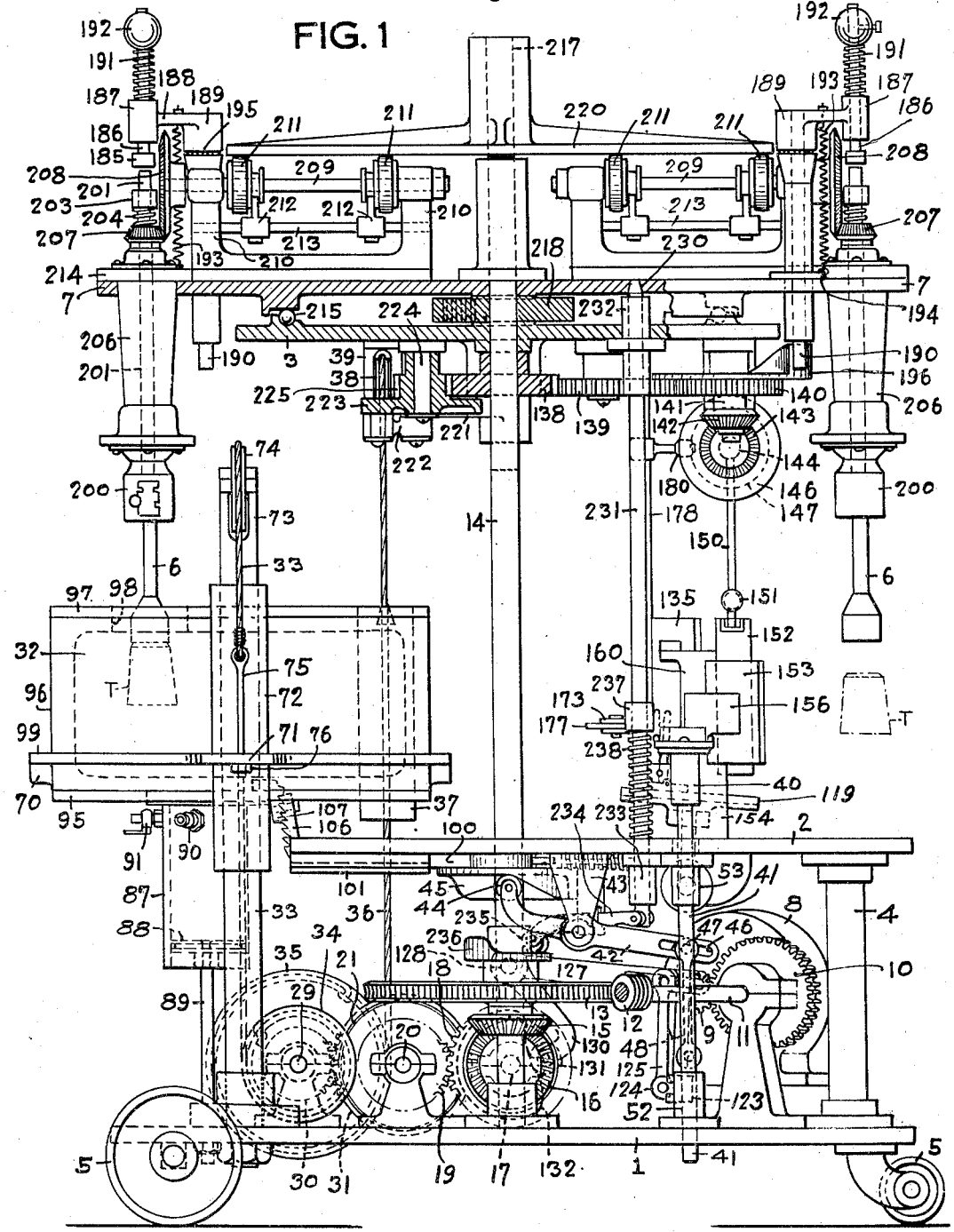

Sept. 15, 1925.

A. J. SANFORD ET AL

MACHINE FOR FIRE POLISHING AND FINISHING GLASSWARE

Filed Aug. 30, 1921     6 Sheets-Sheet 2

INVENTORS
Andrew J. Sanford and
John B. Townsend,
By Kay Totten & Brown
Attorneys Sept. 15, 1925.  
A. J. SANFORD ET AL  
1,554,038

MACHINE FOR FIRE POLISHING AND FINISHING GLASSWARE

Filed Aug. 30, 1921   6 Sheets-Sheet 3

INVENTORS

Sept. 15, 1925.  1,554,038
A. J. SANFORD ET AL
MACHINE FOR FIRE POLISHING AND FINISHING GLASSWARE
Filed Aug. 30, 1921   6 Sheets-Sheet 4

INVENTORS

Sept. 15, 1925.                                           1,554,038
            A. J. SANFORD ET AL
    MACHINE FOR FIRE POLISHING AND FINISHING GLASSWARE
            Filed Aug. 30, 1921       6 Sheets-Sheet 5
FIG. 6
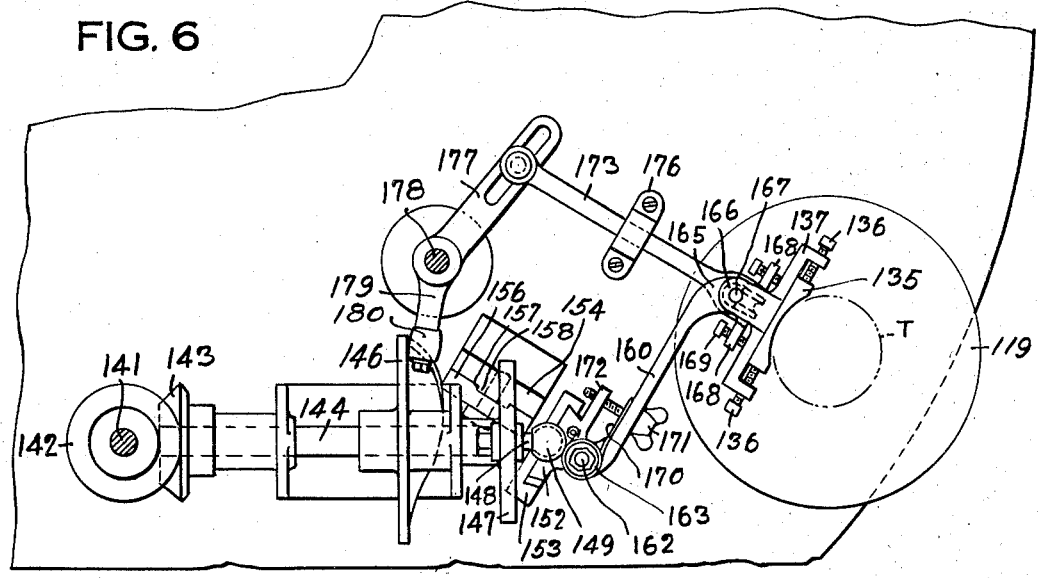
FIG. 7
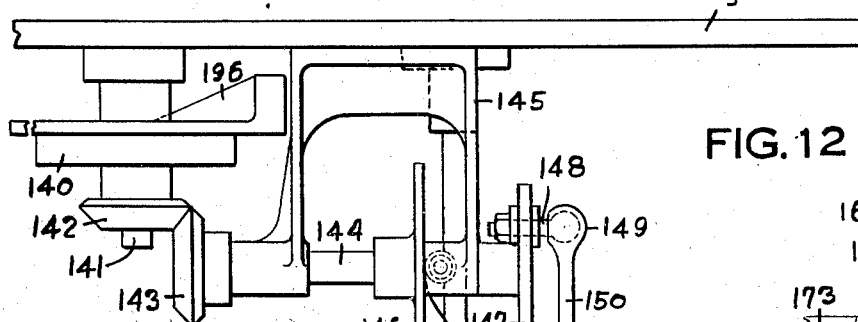
FIG. 12
FIG. 13
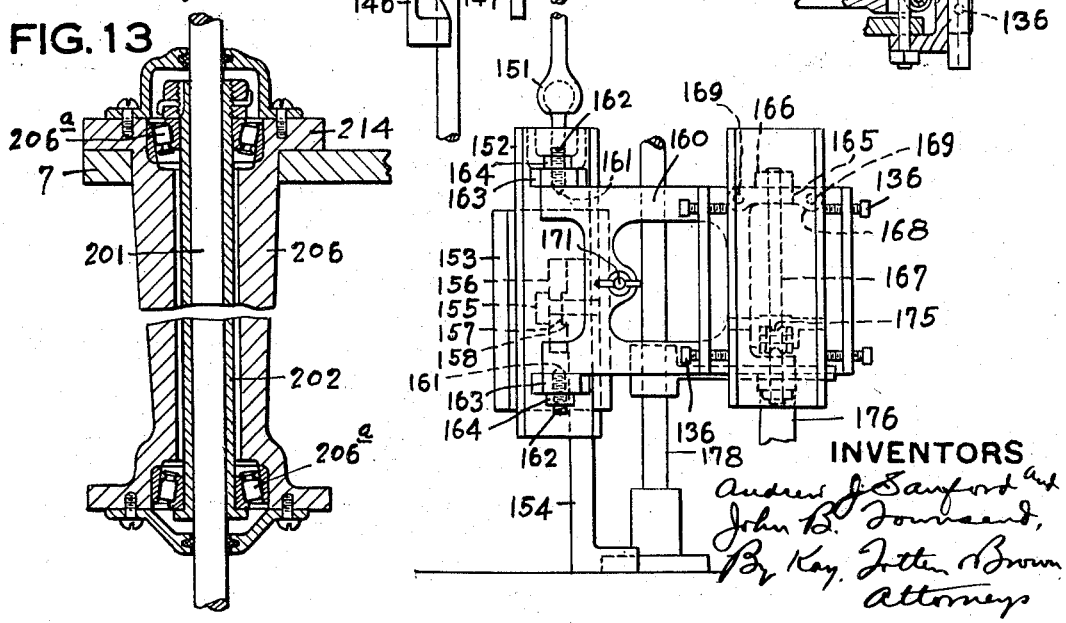
INVENTORS
Andrew J. Sanford
John B. Townsend,
By Kay, Totten & Brown
   Attorneys

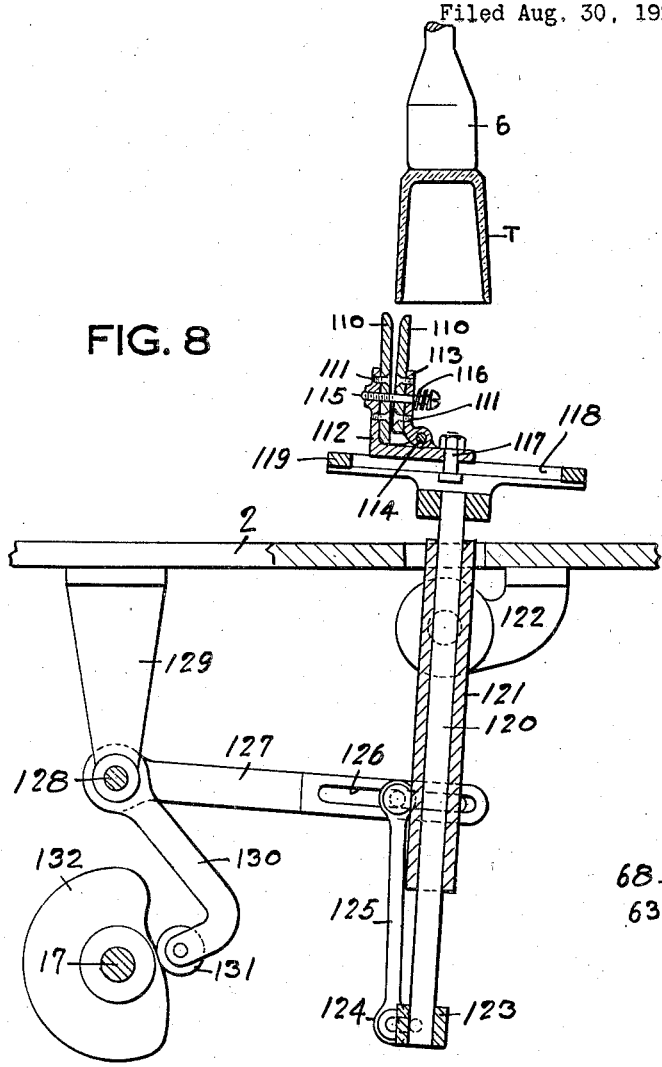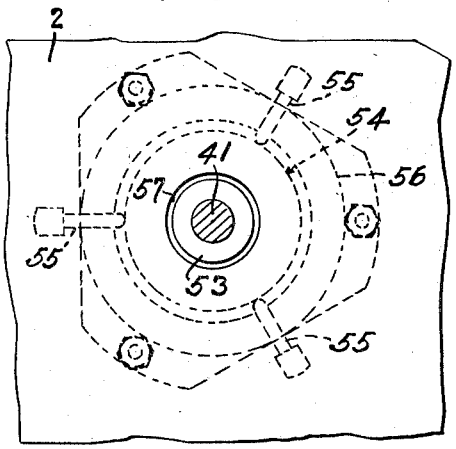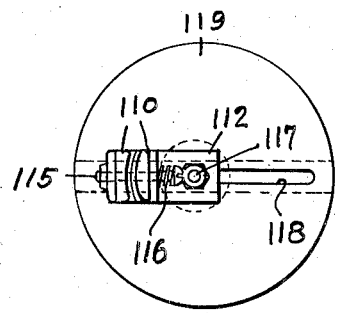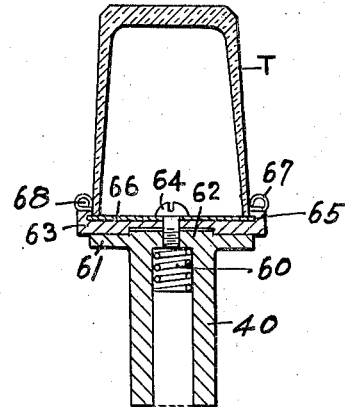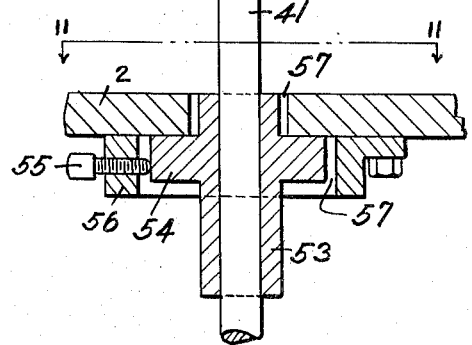

Patented Sept. 15, 1925.

1,554,038

UNITED STATES PATENT OFFICE.

ANDREW J. SANFORD AND JOHN B. TOWNSEND, OF NEWARK, OHIO, ASSIGNORS TO A. H. HEISEY & CO., OF NEWARK, OHIO, A COPARTNERSHIP.

MACHINE FOR FIRE POLISHING AND FINISHING GLASSWARE.

Application filed August 30, 1921. Serial No. 496,884.

*To all whom it may concern:*

Be it known that we, ANDREW J. SANFORD and JOHN B. TOWNSEND, citizens of the United States, and residents of Newark, in the county of Licking and State of Ohio, have invented a new and useful Improvement in Machines for Fire Polishing and Finishing Glassware; and we do hereby declare the following to be a full, clear, and exact description thereof.

Our invention relates to machines for fire polishing and finishing tumblers and other hollow glassware.

Our general object is to improve the construction of machines of this character so as to produce ware of improved quality at high speed.

Another object of our invention is to provide improved means for delivering the ware to the punties which carry the ware to the various polishing and finishing stations.

Another object of our invention is to provide an improved glory-hole furnace for heating the ware in successive stages, and for permitting the ware to cool slightly between the successive heating stages.

A further object of our invention is to provide improved means for restoring the shape of the ware after fire polishing, and for burnishing the ware.

A still further object of our invention is to provide improved means for automatically detaching the ware from the punties after it leaves the finishing position.

Our machine consists in general of a rotary carrier which rotates in a step-by-step manner. As shown and described herein, the carrier advances one-sixth of a revolution at each step. At the first position, the ware is stuck up or snapped up; at the second position, it enters the first glory hole; at the third and fourth positions it enters the second and third glory holes; at the fifth position it is finished; and at the sixth position it is knocked off from the punty which carries it. If the number of glory holes is more or less than three, the rotation of the frame and the number of stopping positions are correspondingly changed.

One of the chief advantages of this machine is that the edges of the ware are slightly cooled between the first and second glory holes and between the second and third glory holes, which reduces the tendency to form a bead around the edge of the ware.

The three glory holes are carried on a single support which is raised and lowered at each step of the frame at the proper time to enclose the ware in the glory holes. The punties carrying the ware are advanced horizontally from the sticking-up position to the knocking-off position, passing the glory hole and finishing positions without being moved vertically. The punties carrying the ware are rotated while they are in the glory hole positions and are rotated at a higher speed while in the finishing position.

Figure 2:
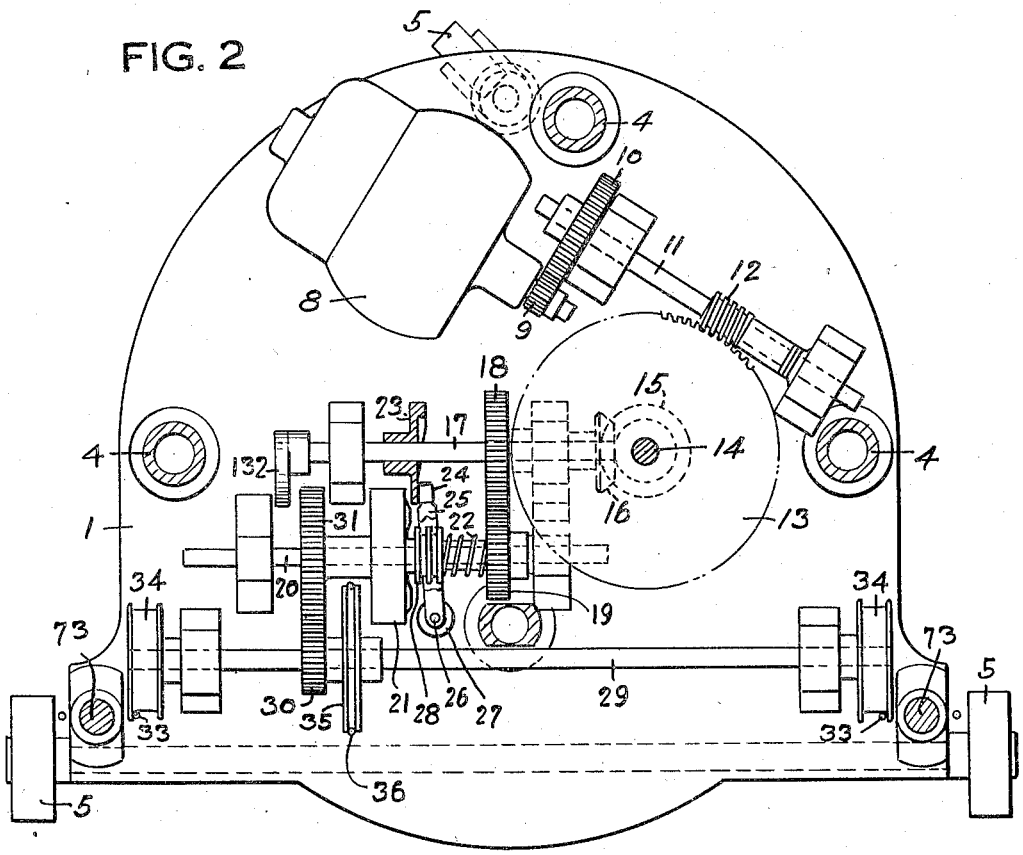
Figure 14:
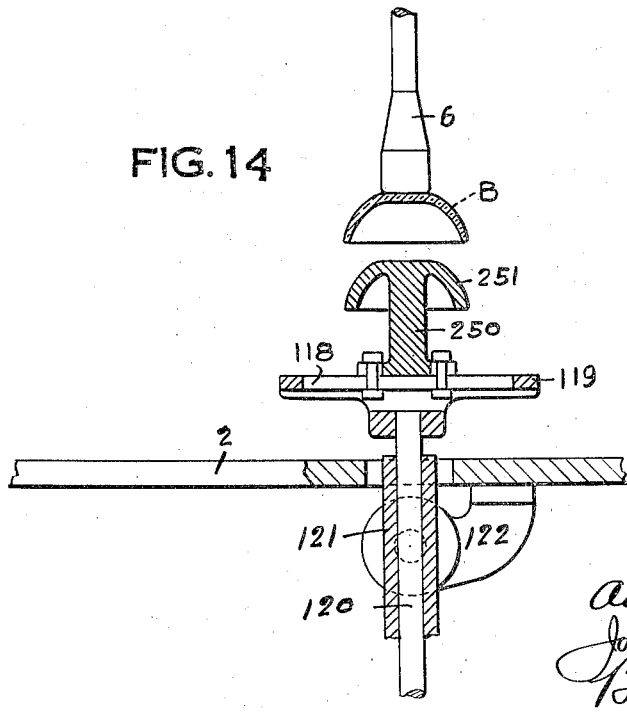
Figure 3:
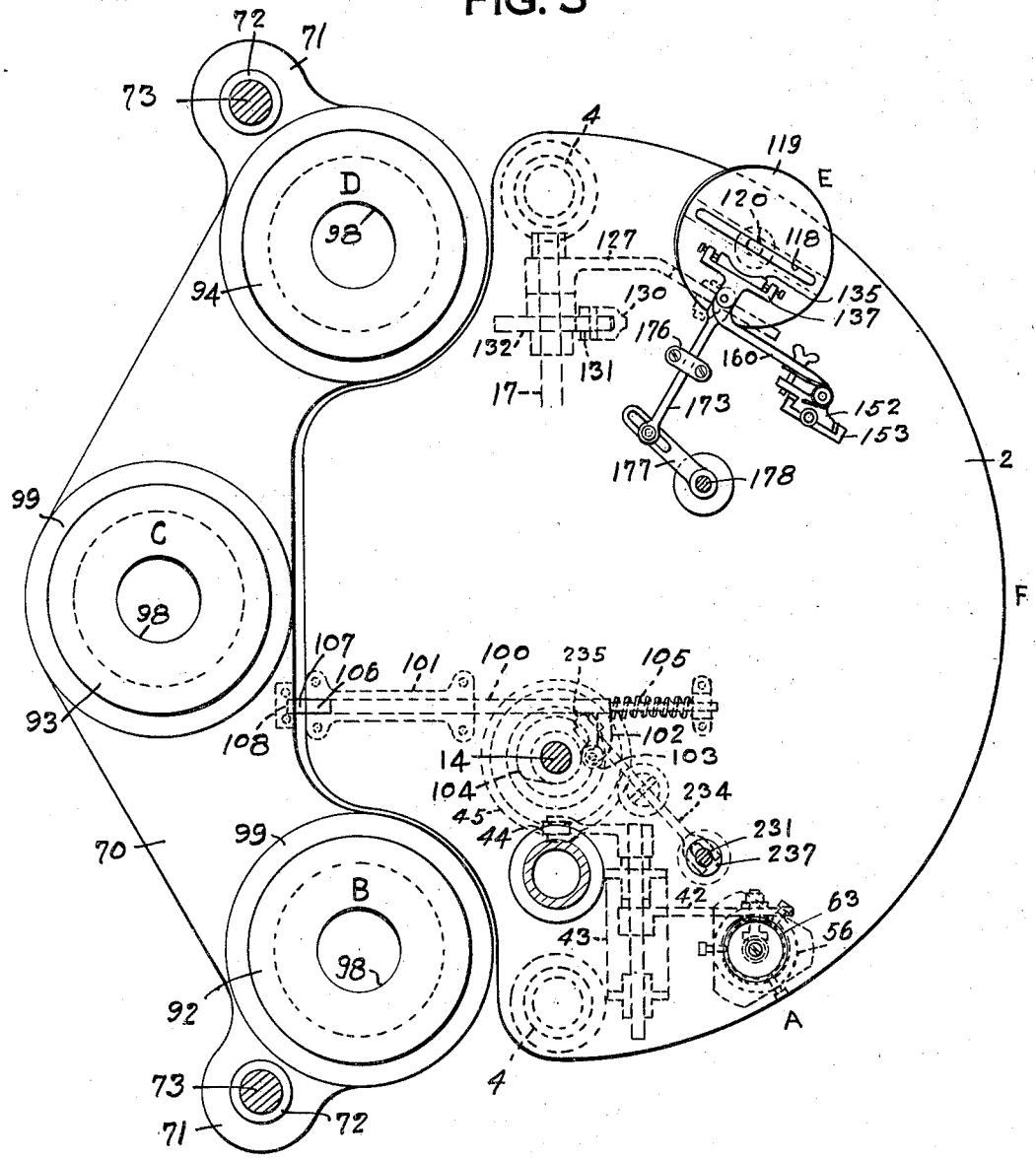
Figure 4:
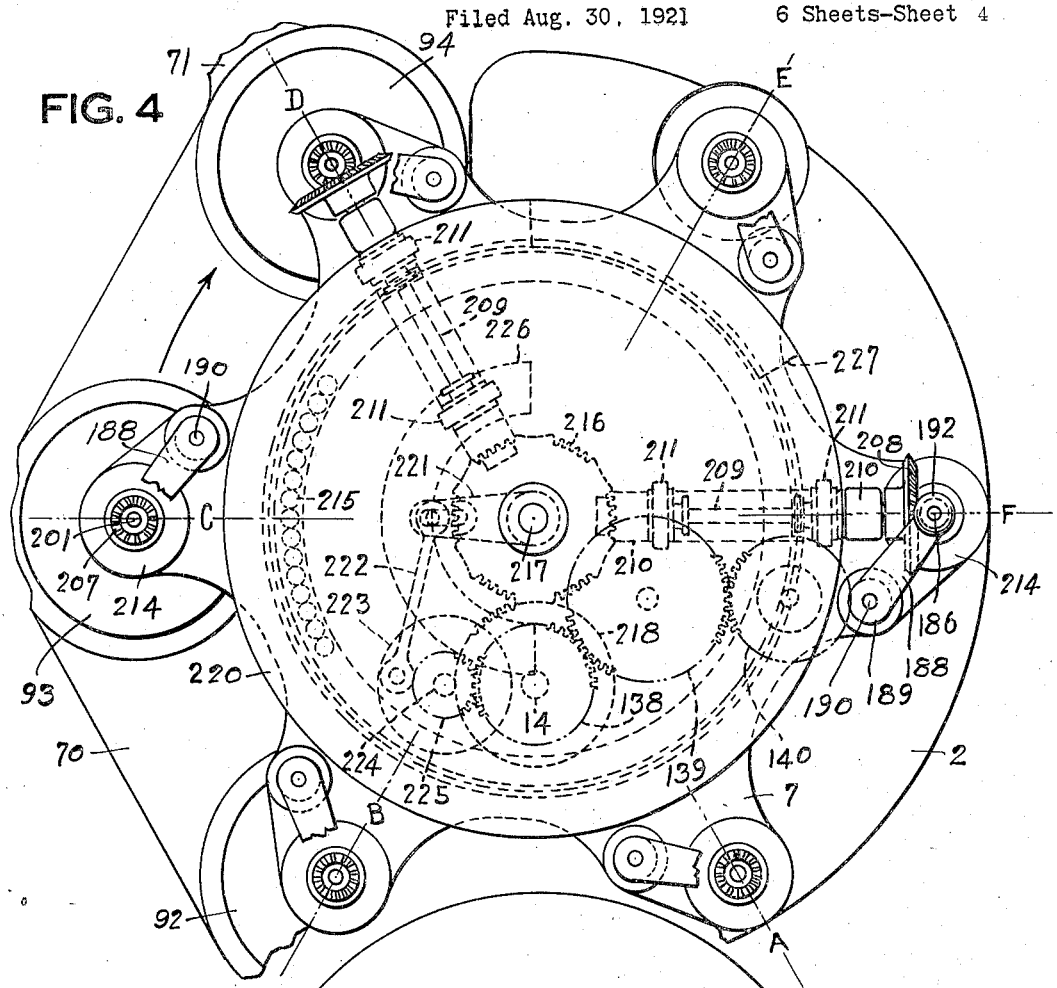
Figure 5:
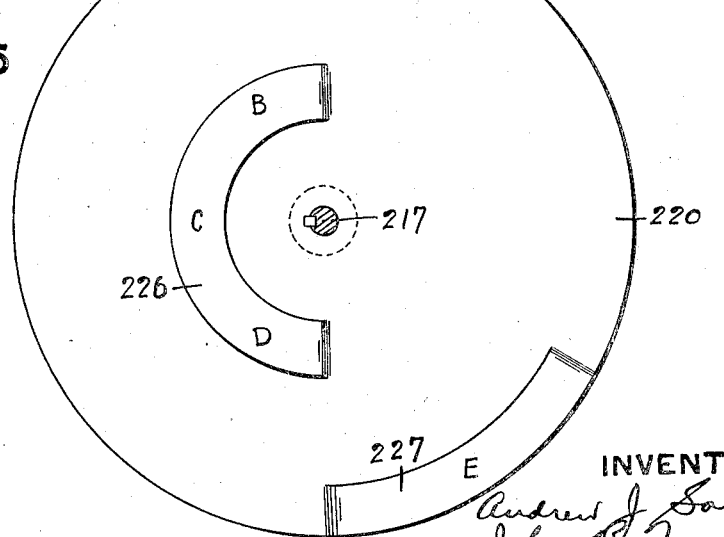

The construction of the best form of our machine now known to us is shown on the accompanying drawing, in which Fig. 1 is a side view, partly in elevation and partly in section, of the entire machine; Fig. 2 is a plan view, with parts in section, of the base plate with the mechanisms carried thereon; Fig. 3 is a plan view, with parts in section, showing the glory hole furnace, the center plate and the sticking-up and finishing mechanisms; Fig. 4 is a top plan view of the machine with the top plate removed; Fig. 5 is a bottom plan view of the top plate; Fig. 6 is a plan view of the burnishing mechanism; Fig. 7 is a side view of the burnishing mechanism of Fig. 6; Fig. 8 is a vertical sectional view of the edge-finishing mechanism; Fig. 9 is a plan view of the head of the edge-finishing mechanism shown in Fig. 8; Fig. 10 is a vertical sectional view of the sticking-up device; Fig. 11 is a plan view, partly in section on the line 11—11, Fig. 10, showing the manner in which the sticking-up device is mounted and adjusted; Fig. 12 is a side view, partly in elevation and partly in section, of a portion of the burnishing device; Fig. 13 is a central vertical section of one of the punty supports; and Fig. 14 is a vertical sectional view showing a modified form of finishing device for use in shaping flared nappies and similar articles.

The frame of the machine consists of a base plate 1, a center plate 2, and a top plate 3, the center and top plates being supported from the base plate by means of three columns 4 which are indicated on Fig. 2, but are mainly omitted from the general view of Fig. 1 for the sake of clearness. The entire machine may rest on suitable wheels 5.

The machine has six positions or stages in which the ware is treated and which are indicated on Fig. 3. At the position A the ware is stuck up or snapped up; at the positions B, C and D the ware enters the three glory holes successively; at the position E the ware is burnished and edge-finished; and at the position F it is knocked off. For the purpose of conveying the ware through the several stages, a set of six punties 6 is provided, these punties being suspended from a plate 7 which is given a step-by-step rotation in the manner described below.

As shown in Figs. 1 and 2, the base plate 1 supports a motor 8, the shaft of which carries a pinion 9 meshing with a gear 10 on a counter-shaft 11 to which is secured a worm 12 meshing with a worm wheel 13 on a vertical power shaft 14. The base plate 1 also carries a set of gearing for raising and lowering the glory hole furnace, this gearing being arranged as follows:

A miter gear 15 is secured to the vertical shaft 14 and meshes with a miter gear 16 on a horizontal shaft 17, which also carries a spur gear 18 meshing with a smaller gear 19 on a counter-shaft 20 which, through the gears described, is continuously rotated by the shaft 14. The shaft 20 also carries a clutch 21 which may be an ordinary type of automobile clutch, and is provided with a spring 22 which tends to throw in the clutch, while a cam 23 on the shaft 17 holds the clutch out of operation through engagement with a roller 24 on a shifting lever 25 which is pivoted at 26 to a suitable standard 27 on the base plate 1, and is provided with a fork engaging the usual clutch collar 28 that is loose on the shaft 20. Another shaft 29 is mounted in bearings on the base plate 1 and carries a spur gear 30 meshing with a gear 31 which is loose on the shaft 20 and is carried by one of the members of the clutch 21, so that when the cam 23 permits the clutch to be thrown in by the spring 22, the shaft 29 is rotated a sufficient number of revolutions to raise the glory hole furnace 32 (Figs. 1, 2, 3 and 4), which is accomplished by means of two ropes 33 secured to sheaves 34 that are keyed to the shaft 29. Another sheave 35 is also keyed to the shaft 29, and a rope 36 is attached to the sheave 35 to operate a counter-weight 37 which nearly balances the weight of the glory hole furnace, as shown in Fig. 1. The counter-weight rope 36 extends up to and around a sheave 38 carried by a bracket 39 which is secured to the underside of the upper stationary plate 3.

*The sticking-up device.*

The ware may be attached to the punties 6 either by sticking up or by snapping up. As shown in the drawings, a sticking-up device is employed, this device being shown on Figs. 1, 10 and 11. It consists of a head 40 carried on the upper end of a rod 41 which extends through the center plate 2 and is moved vertically to apply the tumbler T, or other form of ware, to the under side of the punty 6. For this purpose a lever 42 is pivoted on a bracket 43 secured to the underside of the center plate 2. One end of the lever 42 carries a cam roller 44 which engages a cam 45 secured to the vertical power shaft 14. The other end of the lever 42 is slotted at 46 to receive a pin 47 carried at the upper end of a vertical link 48, the lower end of which is adjustably connected to the rod 41 which supports the sticking-up head 40. The adjustable connection between the link 48 and the rod 41 permits the vertical throw of the rod 41 to be changed to accommodate ware of different heights.

The rod 41 extends through a fixed bearing 52 on the base plate 1, and through an adjustable bearing 53 in the center plate 2. The bearing 53 is given a certain amount of lateral adjustment so that the sticking-up head may be brought into accurate position beneath the punties. For this purpose the bearing 53 is provided with a circular flange 54 which is held between three screws 55 that extend through a ring 56 bolted to the underside of the center plate 2, as shown in Figs. 10 and 11. The opening 57 in the center plate 2, through which the bearing 53 extends, is made sufficiently large to permit the bearing 53 to move laterally to some extent.

The head 40 of the sticking-up device is bored to fit the upper end of the rod 41, and a compression spring 60 is interposed between the upper end of the rod 41 and the bearing surface of the head 40 in order to cushion the slight shock which takes place when the ware is pressed against the under surface of the punty 6. The head 40 has a flange 61 and a central boss 62 for the purpose of attaching and centering a plate 63 which is of proper size and shape to support the particular kind of ware being handled. The plate 63 is attached to the boss 62 of the head by means of a screw 64, and is provided with an undercut slot 65 to retain a heat-resisting backing sheet 66 which may suitably consist of asbestos or other non-inflammable material.

For the purpose of retaining the ware T upon the plate 63, this plate is provided with wire guide loops 67 which, as shown, consist of a continuous length of wire extending through radial openings 68 formed at intervals around the edge of the plate 63. The wire 67 is passed in turn through the openings 68 as if it were sewed through these openings, and the loops of wire thus formed become heated and cooled rapidly enough not to crack the ware which comes in contact with them.

In the operation of the sticking-up device, the cam 45 rotates with the power shaft 14 and periodically rocks the lever 42 which operates through the link 48 to raise and lower the rod 41 and the head 40 at regular intervals. A workman places the ware upon the plate 63 of the sticking-up head, and when the head rises it presses the ware firmly against the under surface of the punty 6 which at the moment is above the sticking-up device, and the ware, being still somewhat plastic, adheres to the underside of the punty and remains suspended when the sticking-up device descends. The plate 7 then turns one-sixth of a revolution, which brings the ware to the position B immediately above the first of the three glory holes.

The glory hole furnaces.

The glory hole furnace construction 32 is shown in Figs. 1 and 3. It comprises a supporting casting 70 having at its opposite ends lugs 71 which are provided with openings in which are secured long vertical bearings 72 which slide on vertical guide posts 73. Each of the two guide posts 73 carries at its top a sheave 74 around which extends one of the operating ropes 33 described above. After passing around the sheave 74 each of the ropes 33 is secured to an eye bolt 75 which extends down through the lug 71 and is held adjustably in place by means of a nut 76.

To the underside of the plate 70 is bolted a dash-pot cylinder 87 in which is a stationary piston 88 carried by a rod 89 that is supported on the base plate 1. A suitable check valve 90 and a pet cock 91 are provided to admit air to the dash pot 87 and to permit it to escape therefrom.

The casting 70 supports three glory hole furnaces 92, 93 and 94 which are similar in construction, each consisting of a bottom plate 95, a circular side casting 96, and a top plate 97 having a central opening 98 to admit the punty 6 and the ware T. Each of the glory holes is lined with fire clay and is provided with gas burners or oil burners for supplying flame to the interior of the glory holes. These burners may be of any usual or desired construction, and are therefore not shown on the drawing. The side castings 96 of the glory holes are provided with circular flanges 99 which support the glory holes in openings formed in the casting 70.

In order to positively hold the glory hole furnace in its raised position while the ware is being fire polished, we provide a latch which engages at this time beneath the casting 70. This latch is shown in Figs. 1 and 3 and consists of a square bar 100 which is slidably mounted in a guide 101 secured to the underside of the center plate 2 and is provided, as shown in Fig. 3, with a lateral projection 102 which carries a cam roller 103 running on a cam 104 secured to the main vertical power shaft 14. A compression spring 105 surrounds the bar 100 and tends to force the bar 100 toward the glory hole furnace. The end of the bar 100 adjacent to the glory hole furnace is provided with an upturned toothed projection 106 to which is adjustably secured another toothed member 107 carrying a latch member 108 which, in the position shown in Fig. 3, engages beneath the casting 70 and prevents the furnace from descending until the cam 104 moves the bar 100 lengthwise in its guideway and withdraws the latch 108 from beneath the furnace.

In the operation of the glory hole furnace, the tumbler or other form of ware, having been attached to the underside of the punty 6 is brought by the rotation of the plate 7 into position above the first glory hole 92. The cam 23 on the shaft 17 is so timed that at this moment it permits the spring 22 to throw in the clutch 21, thereby rotating the shaft 29 through the gears 30 and 31 and winding up the ropes 33 on the sheaves 34 which raises the entire glory hole furnace, thereby enclosing the ware in the first glory hole for a suitable period of time which can be regulated by properly designing the cam 23. The cam 23 then throws the clutch 21 out of operation and the cam 104 withdraws the latch 108 from beneath the casting 70, thereupon the glory hole furnace descends by its own weight, its fall being checked partly by the counterweight 37 and partly by the dash-pot 87.

The ware is then carried to the second glory hole 93 by a further partial rotation of the plate 7, and during its passage from the first glory hole to the second glory hole, that is to say, from the position B to the position C, Fig. 3, the edges of the ware are exposed to the air and cooled slightly, which greatly reduces the tendency to form a bead around the lower end of the ware. These operations are repeated while the ware is at the position C and at the position D, and when the ware leaves the position D it is transferred to the finishing position E, where it is acted upon by the burnishing and edge-finishing mechanisms which will now be described.

Edge-finishing and burnishing mechanisms.

After the ware leaves the glory hole furnace and is brought into the position E, it is engaged simultaneously by a squeezing device for finishing the edge of the ware, and by a burnishing device for polishing and shaping the outer surface of the ware.

The squeezing or edge-finishing device is shown in Figs. 1, 8 and 9. It consists of two blocks or fingers 110 composed of carbon or other suitable material and shaped so as to conform to the curvature of the ware to be finished. One of the fingers 110 is attached by means of screws 111 to the vertical arm of an L-shaped plate 112, and the other finger 110 is similarly attached to a plate 113 which is pivoted at 114 to the plate 112. A screw 115 extends through the plates 112 and 113, and through the fingers 110, a spring 116 being interposed between the head of the screw 115 and the pivoted plate 113 so as to permit an abnormal separation of the fingers 110 to accommodate ware of extra thickness.

The plate 112 is adjustably secured by means of a bolt 117 in a slot 118 formed in a circular plate 119 which is secured to the upper end of a rod 120. The rod 120, as best shown in Fig. 8, extends slidably through a long bearing sleeve 121 which is pivotally adjustable on a bracket 122 secured to the underside of the center plate 2. The lower end of the rod 120 carries a block 123 which is attached by means of a ball and socket joint 124 to a link 125, the upper end of which is adjustable in a slot 126 formed in a lever 127 that is secured to a rock shaft 128 carried by a bracket 129 on the underside of the plate 2. The rock shaft 128 also carries the lever 130 having a cam roller 131 which rides upon a cam 132 secured to the horizontal shaft 17, as shown on Figs. 1, 2 and 3.

When the ware is brought into the position E above the edge-finishing device just described, the cam 132 operates through the levers 130 and 127 and the link 125 to raise the rod 120, thereby bringing the fingers 110 into contact with the opposite sides of the edge of the ware T, which at this time is caused to rotate rapidly by means to be described later. The fingers 110 remove any bead that may have formed on the edge of the ware T, and also assist in restoring the ware to its original circular shape which may have been somewhat deformed in the glory hole furnace. The vertical throw of the rod 120 may be adjusted by changing the point of connection between the upper end of the link 125 and the slotted lever 127. The inclination of the fingers 110 may be varied to suit the inclination of different kinds of ware by pivotally adjusting the bearing 121 on the bracket 122, and the fingers 110 may also be adjusted for ware of different diameters by adjusting the plate 112 along the slot 118.

While the edge-finishing device is operating on the ware, the outer surface of the ware is also engaged by the burnishing device, which is shown in Figs. 1, 3, 6, 7 and 12. This burnishing device consists of a block 135 composed of carbon, wood, copper, phosphor-bronze or other suitable material, shaped to conform to the curvature of the ware, as shown in Fig. 6, and adjustably secured by means of screws 136 in a holder 137 which is given a combined vertical and horizontal movement to bring the buffer 135 into contact with the ware and to raise and lower the buffer while it rests against the ware. Power for moving the buffer in this manner is taken from the main vertical power shaft 14 through a spur gear wheel 138 which is keyed to the shaft 14 below the upper stationary plate 3 and which meshes with an idler gear 139 meshing in turn with a gear 140 which is carried by a stud 141 secured to the underside of the top plate 3. The stud 141 carries at its lower end a miter gear 142 meshing with another miter gear 143 on one end of a horizontal shaft 144 which is mounted in bearings in a bracket 145 on the underside of the top plate 3. The shaft 144 also carries a cam 146 and a crank disc 147. The crank disc 147 carries an adjustable crank pin 148 to which is connected, by means of a ball and socket joint 149, a vertical link 150, the lower end of which is attached by means of another ball and socket joint 151 to a slide 152 which slides in a vertical guide 153 carried by a post 154 arising from the center plate 2. The attachment between the guide 153 and the post 154 is made by means of a bolt 155 passing through a circular head 156 extending out from the guide 153, as shown in Fig. 6, and having a circular recess 157 to receive a correspondingly shaped boss 158 on the post 154. This arrangement enables the guide 153 to be adjusted to bring the slide 153 parallel to the inclination of various kinds of ware, the ball and socket joints 149 and 151 adapting themselves to this adjustment, and the crank pin 148 being adjusted in the crank disc 147 to impart the required throw to the slide 152 in accordance with the size of the ware to be finished.

The holder 137 which carries the buffer 135 is carried by the slide 152 through a swinging plate 160, best shown in Figs. 6 and 7, the plate 160 being shown in Fig. 7 as if swung to the right in Fig. 6.

The plate 160 is provided on its upper and lower edges adjacent to the slide 152 with depressions 161 which receive pivot pins 162 carried by lugs 163 extending from the slide 152 and secured in place by means of nuts 164. The outer swinging end of the plate 160 is provided with lugs or extensions 165, and the holder 137 is provided at its upper and lower ends with projections 166 which engage above and below the projections 165 on the plate 160, as best shown in Fig. 12. A rod 167 extends through all of the projections 165 and 166 and forms a hinge joint between the plate 160 and the holder 137. The rod 167 may be upset at its ends to hold it in place, or may be secured by means of screw threads and nuts.

The plate 160 has two lugs 168 adjacent to the rear of the holder 137, and adjusting screws 169 extend through screw threaded openings in the lugs 168 into contact with the rear of the holder 137, so as to adjust the inclination of the holder 167 with respect to the plate 160 to accommodate different sizes and shapes of ware.

A spring 170, at the pivot of the swinging plate 160, bears against the rear of this plate and tends to move the burnisher towards the ware. The tension of this spring is adjusted by means of a thumb screw 171 extending through the plate 160 and through a lug 172 extending out from the slide 152.

In addition to its vertical movement produced by the slide 152 and its attachments, the plate 160 which carries the buffer 135 has a swinging movement around the pivot pins 161. This swinging movement is produced by means of a rod 173 having a forked end 174 in which is carried a roller 175. This roller 175 is grooved to fit the vertical hinge rod 167 of the holder 137, so as to provide a connection between the rod 173 and the holder 137 for all vertical positions of the latter. The rod 173 extends through a guide 176 and has a pin and slot connection at its end opposite to the fork 174, with a lever 177 which is carried by a rock shaft 178 extending between the center plate 2 and the top plate 3 and journaled in suitable bearings thereon. A lever 179 is also secured to the vertical rock shaft 178 and carries a cam roller 180 running on the cam 146 which, as stated above, is carried by the horizontal shaft 144. The cam 146 operates through the connections just described to withdraw the buffer from the position shown on Fig. 6 for a short time while the ware is being changed, and then allows the buffer to return to engagement with the ware, as shown on Fig. 6, this return movement being produced by means of the spring 170. The distance through which the buffer is withdrawn from the ware is regulated by the pin and slot connection between the rod 173 and the lever 177. The cam roller 180 may be held against the cam 146 by means of a suitable spring, not shown.

In the operation of the burnishing device described above the buffer 135 is reciprocated up and down by means of the slide 152 throughout its engagement with the ware, and at the end of the burnishing operation the buffer is withdrawn from the ware by means of the cam 146 and its connections. While the buffer is moving up and down, the roller 175 rides on the rod 167, and the rod 173 therefore takes no part in the vertical movement but is ready to withdraw the buffer whenever the cam 146 causes it to do so, irrespective of the vertical position of the buffer.

The knocking-off device.

When the finished ware reaches the position F it is ready to be removed from the machine and is detached from its punty by means of the knocking-off device shown in Figs. 1 and 4. One of these devices is provided for each of the punties 6 and consists of a hammer 185 directly above the upper end of the punty rod and adapted to strike a sharp blow on the end of the punty rod when the punty reaches the knocking-off position. For this purpose the hammer 185 is carried at the lower end of a rod 186 which slides in a bearing 187 carried by an arm 188 which extends out from a collar 189 secured to the upper end of a rod 190. A spring 191 surrounds the rod 186 between the bearing 187 and a weight 192 which is secured to the upper end of the hammer rod 186. Another spring 193 is connected between the arm 188 and the flange 194 of the bearing for the rod 190, and a washer 195 of rubber or the like may be interposed between the upper end of this bearing and the collar 189 to absorb shock.

In order to raise the rod 190 as it approaches the knocking-off position, a cam 196 is secured to the stud 141 above the gear wheel 140. This cam is so constructed and timed that it engages the lower end of the rod 190 and raises it, thus stretching the spring 193. When the rod 190 rides off the end of the cam 196 the spring 193, aided by the weight 192, causes the hammer 185 to strike a sharp blow on the upper end of the punty rod 6 which knocks off the ware from the lower end of the punty. The blow of the hammer is cushioned by means of the washer 195. The spring 191 serves to raise the hammer 185 sufficiently to normally clear the upper end of the punty rod so that it will not interfere with the punty while the punty is rotated in the glory holes and in the finishing position.

Punty-operating mechanism.

Each of the six punties is carried in a suitable chuck 200 of ordinary construction which is secured to the lower end of a rod 201 which extends through a hollow shaft 202 and rotates therewith. Near its upper end the rod 201 carries a collar 203 and a spring 204 is interposed between the collar 203 and a bevel pinion 207 feathered on the upper end of the rod 201. By this means the rod 201 carrying the chuck 200 and the punty 6 is able to move vertically to a small extent when the ware is being stuck up and knocked off, and the spring 204 then returns the rod 201 to its normal position. The hollow shaft 202 is rotatably mounted in suitable roller bearings 206, as best shown in Fig. 13.

Each individual punty mechanism also includes gearing for rotating the punty while in the glory hole and finishing positions, this gearing comprising the bevel pinion 207 secured to the rod 201 and meshing with a bevel gear wheel 208 on a horizontal shaft 209 which is supported in bearings 210 on the rotating plate 7. Each shaft 209 carries two friction wheels 211 which are feathered on the shaft 209 and may be adjusted lengthwise of this shaft by means of forks 212 carried by a rod 213 that extends through the bearings 210. The means by which the friction wheels 211 are operated to rotate the punties will be described below.

All of the six bearings 206 which carry the punties extend through openings formed near the outer edge of the rotary plate 7 and are suspended by means of flanges 214. The plate 7 rests on ball bearings 215 carried in a suitable ball race on the upper stationary plate 3, and is given a step-by-step rotation by means of an intermittent gear 216, which is bolted to the underside of the plate 7 and loosely surrounds a central vertical shaft 217. The intermittent gear 216 meshes with a mutilated gear 218 carried by the main vertical power shaft 14, the gear 218 having a sufficient number of teeth so that during each revolution of the power shaft 14 the gear 216, carrying with it the plate 7 and the six punties, advances one-sixth of a revolution.

In order to rotate the friction wheels 211 while they are in the positions B, C, D and E, that is to say, while the ware is in the glory holes and at the finishing position, a friction disc 220 is keyed to the central shaft 217 and is oscillated back and forth one-sixth of a revolution in each direction by means of a lever 221 which has one end secured to the oscillating central shaft 217, while its other end is attached by a pin and slot connection to one end of a pitman 222. The other end of the pitman 222 is pivoted on the underside of a crank wheel 223 mounted on a pin 224 which hangs from the underside of the stationary top plate 3. A gear 225 is formed integral with, or secured to, the crank wheel 223 and meshes with the gear 138 which is carried by the vertical power shaft 14.

The connectons just described oscillate the friction disc 220 throughout the operation of the machine, but this friction disc only actuates the punties during a part of their travel. For this purpose the underside of the friction disc 220 is provided with two curved working faces 226 and 227. The working face 226 is formed on that part of the disc 220 which is opposite to the three glory hole positions B, C and D, and the working face 227, which is formed at the edge of the plate 220, is located opposite the position E, where the ware is finished. When each punty is in the glory hole positions, and also while it is traveling from one glory hole position to the next, its inner friction wheel 211 engages the inner working surface 226 of the disc 220 and is thereby oscillated by the friction disc, this oscillation being communicated to the punty 6 and the ware. When the punty reaches the finishing position E its inner friction wheel 211 has passed beyond the working surface 226 of the friction disc, and its outer friction wheel 211 engages the outer working face 227 of the friction disc, whereby the punty is oscillated at a higher speed than when the punty is at the glory hole positions. When the punty is in the knocking-off position and in the sticking-up position neither of its friction wheels is in engagement with the oscillating disc, and consequently there is no rotation of the punties.

In order to hold the plate 7 stationary between its successive step-by-step movements, this plate is provided with a series of tapered openings 230 and a vertical rod 231 is adapted to act as a latch by entering the openings 230 successively. The rod 231 extends through a bearing 232 in the top plate 3 and through a bearing 233 beneath the center plate 2. At its lower end the latch rod 231 is pivotally connected to a lever 234 which is pivoted midway between its ends on a suitable support and carriers at its outer end a cam roller 235 running upon a cam 236 carried by the vertical shaft 14. A collar 237 is secured to the rod 231 and a spring 238 surrounds this rod between the collar 237 and the center plate 2. The spring 238 tends to force the rod 232 up and into one of the openings 230 while the cam 236 operates through the lever 234 to draw the latch rod 231 down when the plate 7 is to be advanced another step.

Fig. 14 shows a modification by which this machine can be adapted to finish and form flared nappies or other kinds of hollow ware. In this case the edge squeezing device carried at the top of the rod 120, as described above, is replaced by a former 250 having a head 251 of the proper inside shape of the article to be formed. The article B carried at the lower end of its punty 6 is brought above the former 250 at the finishing position. Here the rapid rotation of the punty, produced by the engagement of the outside friction wheel 211 with the oscillating disc 220 causes the rim of the article to flare outwardly. The former 250 then rises into engagement with the article, and at the same time the buffing device already described engages the flare and rolls it down around the head 251 of the former. As a variation of this method, the buffing member may be made of the exact outside shape of the article B, in which case both the inside and the outside of the article are finished to exact shape.

In making nappies and other forms of hollow ware that are not flared, the head 251 shown in Fig. 14 is used, and the shape of the ware is such that it does not flare into the form C, but remains in the form B, being engaged by the head 251 and by the buffing device in the manner described above.

The operation of the several mechanisms of our machine has been indicated in the above description. All of the five operations of attaching the ware to the punty, fire-polishing, edge-squeezing, side-finishing and knocking-off, take place simultaneously in the intervals while the punty carrier is at rest. While the punty carrier is rotating to bring the punties to their next positions, a workman places a tumbler on the sticking-up carrier, and the tumbler that has been knocked off is removed either by another workman or by means of an automatic transfer mechanism, and is ready for the annealing leer. At this time the glory hole furnace is in the lower position, and the burnisher is withdrawn, but is still reciprocated up and down so that no time is lost in beginning the next burnishing operation.

Each tumbler, after being attached to the punty, either through adhesion or by means of a snap carried by the punty, moves to a position above the first glory hole and stops there. The glory hole furnace rises, enclosing the tumbler in the first glory hole, and then descends, leaving the tumbler free to move to the second glory hole. In the same way, the tumbler is again heated in the second and third glory holes, and is allowed to cool slightly while passing from one glory hole to the next, which checks the tendency to form a bead of melted glass around the edge of the inverted tumbler. After the third heating step the tumbler is moved to the edge-finishing and burnishing position, and thence to the knocking-off position, where it is detached from the punty and may be caught in a sand box and taken away by hand, or it may be caught on a suitable support and removed automatically to a leer. This automatic transfer mechanism forms no part of our present invention and is therefore not shown in this application.

Numerous changes in the construction and arrangement of the parts of our machine may readily be made by persons skilled in the art, and we therefore wish it to be understood that our invention is not restricted to the particular details described above, but is limited only by the scope of the appended claims.

We claim as our invention:

1. Apparatus for fire-polishing and finishing glassware comprising a circular series of stations, including a ware-receiving station, a plurality of fire-polishing stations, a finishing station and a ware-removing station, a rotatable carrier disposed above the said stations and carrying a series of vertical punties, means at the said ware-receiving position for automatically attaching the ware to the said punties, a separate heating chamber at each of the said fire-polishing stations, burnishing and shape-restoring means at the said finishing station, and automatic ware-detaching means at the said ware-removing position.

2. Apparatus for fire-polishing and finishing glassware comprising a carrier, a circular series of vertical and individually rotatable punties carried by the said carrier, means for imparting a step-by-step rotation to the said carrier and means, automatically operable during the intervals between the said movements of the carrier, for attaching the ware to the said punties, means for fire-polishing the ware carried by the said punties, means for finishing the ware which has been fire polished, and means for detaching the ware which has been finished.

3. Apparatus for fire-polishing and finishing glassware comprising a punty for suspending the ware to be polished, a plurality of heating chambers, means for intermittently moving the said punty to bring the ware above the said heating chambers successively, and means for raising and lowering the said heating chambers to bring the ware into the adjacent heating chamber and for then removing the ware therefrom.

4. Apparatus for fire-polishing and finishing glassware comprising a ware holder adapted to suspend the ware to be polished, a glory hole furnace disposed beneath the said ware holder and means for raising the said glory hole furnace to envelop the ware and for thereafter lowering the said glory hole furnace away from the ware.

5. Apparatus for fire-polishing and finishing glassware comprising a ware holder adapted to suspend the ware to be polished, a furnace comprising a plurality of spaced glory holes, means for moving the said ware holder to bring the ware above the said glory holes successively, and means for raising and lowering the said furnace whereby the ware is placed in each of the said glory holes successively and is exposed to the atmosphere while passing from one glory hole to the next glory hole.

6. Apparatus for fire-polishing and finishing glassware comprising a carrier, a plurality of vertical punties carried by said carrier and adapted to suspend the ware to be polished; means for imparting a step-by-step movement to said carrier, a furnace comprising a plurality of glory holes disposed beneath the said carrier and spaced apart a distance equal to the distance between the said punties, and means for raising and lowering the said furnace in the intervals between the said step-by-step movement of the said punty carrier.

7. Apparatus for fire-polishing and finishing glassware comprising a horizontally rotatable carrier, a series of vertical punties carried by said carrier and adapted to suspend the ware to be polished, a furnace comprising a plurality of glory holes disposed beneath the said carrier and spaced apart a distance equal to the distance between the said punties, means for imparting a step-by-step rotation to the said carrier, and means for raising and lowering the said furnace in the intervals between the said step-by-step movement of the said carrier.

8. Apparatus for fire-polishing and finishing glassware comprising a horizontally rotatable carrier, a plurality of vertical punties equally spaced around said carrier and individually rotatable thereon, means for automatically attaching ware to the said punties at one position thereof, a furnace comprising a plurality of glory holes disposed beneath other positions of the said punties, means for intermittently rotating the said carrier, means for raising and lowering the said furnace in the intervals between the said movements of the said carrier, and means for finishing the ware and for automatically detaching the ware from the said punties after leaving the said glory hole furnace.

9. Apparatus for fire-polishing glassware comprising a plurality of separate glory hole furnaces, a common support for said furnace, means for raising and lowering the said support, and fixed vertical guides associated with the said support.

10. Apparatus for fire-polishing glassware comprising a plurality of separate glory hole furnaces, a common support for the said furnaces, means for raising and lowering the said support, fixed vertical guide posts, and elongated bearings carried by the said support and surrounding the said guide posts.

11. Apparatus for fire-polishing glassware comprising a plurality of separate glory hole furnaces, a common support for the said furnaces, means for raising the said support, and a latch for holding the said support in its raised position.

12. Apparatus for fire-polishing glassware comprising a plurality of separate glory hole furnaces, a common support for the said furnaces, means for raising the said support, a latch for holding the said support in its raised position, means for adjusting the height to which the said support is raised and means for adjusting the vertical position of the said latch.

13. Apparatus for fire-polishing glassware comprising a plurality of separate glory hole furnaces, a common support for the said furnaces, vertical guides associated with the said support, a counterweight for nearly balancing the weight of the said furnace and support, ropes for raising said support and means, including sheaves for the said ropes and an intermittently operable clutch, for causing the said ropes to raise the said support.

14. Apparatus for fire-polishing glassware comprising a plurality of separate glory hole furnaces, a common support for the said furnaces, vertical guides associated with the said support, a counterweight for nearly balancing the weight of the said furnaces and support, ropes for raising said support, means, including sheaves for the said ropes and an intermittently operable clutch, for causing the said ropes to raise the said support, a latch for holding the said support in its raised position and means for automatically releasing said latch and the said clutch and for thereby permitting the said furnaces and support to descend by their own weight.

15. Apparatus for fire-polishing glassware comprising a plurality of separate glory hole furnaces, a common support for the said furnaces, vertical guides associated with the said support, a counterweight for nearly balancing the weight of the said furnaces and support, ropes for raising said support, means, including sheaves for the said ropes and an intermittently operable clutch, for causing the said ropes to raise the said support, a latch for holding the said support in its raised position, and means for automatically releasing the said latch and the said clutch and for thereby permitting the said furnaces and support to descend by their own weight, and means for cushioning the fall of the said furnaces and their support.

16. Apparatus for fire-polishing glassware comprising a plurality of circular glory hole furnaces, a support having circular openings for receiving the said furnaces, flanges formed on the said furnaces and adapted to support the said furnaces in the said openings, guide lugs formed at opposite ends of the said support, elongated vertical bearings carried by the said lugs, fixed vertical guide posts extending through the said bearings, and means for raising and lowering the said support.

17. Apparatus for fire-polishing glassware comprising a plurality of circular glory hole furnaces, a support having circular openings for receiving the said furnaces, flanges formed on the said furnaces and adapted to support the said furnaces in the said openings, guide lugs formed at opposite ends of the said support, elongated vertical bearings carried by the said lugs, fixed vertical guide posts extending through the said bearings, means for raising and lowering the said support, a vertically adjustable latch for holding the said support in its raised position, a spring for forcing the said latch into its holding position, a cam for withdrawing the said latch and releasing the said support, a clutch operatively connected to raise the said support, means for automatically releasing the said clutch to permit the said furnaces and support to descend by their own weight, and a dash pot for cushioning the fall of the said furnaces and their support.

18. The combination with a fire-polishing machine, of a ware holder and means for attaching ware to the said holder comprising a ware support and means for raising and lowering the said support.

19. The combination with a fire-polishing machine, of a series of ware holders, means for attaching ware to the said holders successively, the said attaching means comprising a ware support, means for raising and lowering the said support, and means for successively bringing the said ware holders above the said attaching means.

20. The combination with a fire-polishing machine, of a circular series of vertical punties, means for bringing the said punties successively to a ware-receiving position, and means at said ware-receiving position for attaching the ware to the said punties; the said attaching means comprising a ware support and means for raising and lowering the said support in the intervals between the movements of the said punties.

21. A device for attaching glassware to vertical ware-supports of a fire-polishing machine comprising a vertical rod, a ware support carried at the top of the said rod, means for raising and lowering the said rod and means for laterally adjusting the said rod.

22. A device for attaching glassware to vertical ware-supports of a fire-polishing machine comprising a vertical rod, a ware support carried at the top of said rod, means for raising and lowering the said rod, a bearing through which said rod extends, and means for laterally adjusting the said bearing.

23. A device for attaching glassware to vertical ware-supports of a fire-polishing machine comprising a vertical rod, a ware support carried at the top of the said rod, means for raising and lowering the said rod, a bearing through which the said rod extends, a circular flange formed on said bearing, and a plurality of adjusting screws engaging the said flange.

24. A device for attaching glassware to vertical ware-supports of a fire-polishing machine comprising a vertical rod, a ware support carried at the top of the said rod, means for raising and lowering the said rod, a bearing through which the said rod extends, a fixed support adjacent to the said bearing, an annular flange secured to said support, a circular flange formed on said bearing within the said fixed annular flange and a plurality of adjusting screws extending through the said fixed annular flange and engaging the said bearing flange.

25. A ware-attaching device for fire-polishing machines comprising a vertical rod, a ware support carried at the top of the said rod, means for raising and lowering the said rod and means for varying the height to which the said rod is raised.

26. A device for attaching glassware to vertical ware-supports of a fire polishing machine comprising a vertically slidable rod, a ware support carried at the top of the said rod, and a cushioning spring interposed between the said ware support and the upper end of the said rod.

27. A device for attaching glassware to vertical ware-supports of a fire polishing machine comprising a vertically slidable rod, a head having a sleeve fitting over the upper end of the said rod, a ware support carried by the said head, and a cushioning spring disposed within the said sleeve and above the upper end of the said rod.

28. A device for attaching glassware to vertical ware-supports of a fire-polishing machine comprising a vertically slidable rod, a head carried at the top of the said rod, and a ware support removably carried by said head.

29. A ware-attaching device for fire-polishing machines comprising a vertically movable ware-supporting plate covered with heat-resisting material and resilient means for holding the ware upon the said supporting plate.

30. A ware-attaching device for fire-polishing machines comprising a vertically movable ware-supporting plate covered with heat-resisting material, and resilient means for holding the ware upon the said supporting plate, the said resilient holding means comprising a series of wire loops disposed around the edge of the said supporting plate.

31. A ware-attaching device for fire-polishing machines comprising a vertically movable head, a circular plate secured to said head and having a peripheral flange provided with a series of openings, and a continuous length of wire extending spirally through the said openings and forming a series of ware retaining loops.

32. A ware-attaching device for fire-polishing machines comprising a vertically movable head, a circular plate secured to said head and having a peripheral flange provided with a series of openings, and a continuous length of wire extending spirally through the said openings and forming a series of ware-retaining loops, an undercut recess formed around the inner and lower edge of the said flange, and a sheet of heat-resisting material secured to the upper surface of the said plate and having its edges received in the said recess.

33. Apparatus for fire-polishing and finishing glassware comprising a series of vertical punties, means for moving the said punties successively to a ware-receiving position, a plurality of fire-polishing furnaces, a finishing position and a ware-discharging position, and means for individually rotating the said punties while they are at the said fire-polishing and finishing positions.

34. Apparatus for fire-polishing and finishing glassware comprising a series of vertical punties, means for moving the said punties successively to a ware-receiving position, a plurality of fire-polishing positions, a finishing position, and a ware-discharging position, means for individually rotating the said punties while they are at the said fire-polishing positions, and means for individually rotating the said punties at higher speed while they are in the said finishing position.

35. Apparatus for fire-polishing and finishing glassware comprising a series of vertical punties, and means for individually rotating each of the said punties comprising two friction wheels geared to rotate the said punty, means for oscillating one of the said friction wheels while the said punty is in a fire-polishing position and means for oscillating the other friction wheel while the said punty is in a finishing position.

36. Apparatus for fire-polishing and finishing glassware comprising a series of vertical ware holders, punties, and means for individually rotating each of the said punties comprising a shaft geared to rotate the said punty, two friction wheels carried by the said shaft and an oscillating plate having friction surfaces adapted to engage the said friction wheels to oscillate the said punty and thereafter to oscillate the said punty at a higher speed.

37. Apparatus for fire-polishing and finishing glassware comprising a revoluble series of vertical punties, and means for individually rotating each of the said punties comprising a shaft geared to rotate said punty and arranged radially with respect to the axis of revolution of the said punty and an oscillating plate having an arcuate friction surface adapted to engage one of the said friction wheels when the said punty is in a fire-polishing position and having another arcuate friction surface of longer radius adapted to engage the other friction wheel when the said punty is in a finishing position.

38. Apparatus for fire-polishing and finishing glassware comprising a circular series of six vertical punties, means for intermittently revolving the said punties around a common axis, a fire-polishing furnace comprising three glory holes, a set of finishing mechanism, and means for individually rotating the said punties while in the fire-polishing and finishing positions, the said rotating means comprising shafts geared to rotate the said punties and arranged radially with respect to the axis of revolution of the said punties, two friction wheels of equal diameter carried by the said shafts, a circular plate disposed above all of the said sets of shafts and friction wheels, and means for oscillating the said plate, the said plate having on its underside a semi-circular friction surface adapted to engage the inner friction wheel of each punty while the said punty is in the three fire-polishing positions, and having another arcuate friction surface of longer radius adapted to engage the outer friction wheel of each punty while the punty is in the finishing position.

39. A device for finishing glassware comprising a burnishing block shaped to conform approximately to the surface of a hollow glass article, means for moving the said block along the surface of the article to be finished, and means for moving the said block toward and away from the said article.

40. A device for finishing glassware comprising a burnishing block, a holder for the said block, means for angularly adjusting the said holder to cause the said block to conform to the article to be finished, means for moving the said holder along the surface of the said article, and means for moving the said holder toward and away from the said article.

41. A device for finishing glassware comprising a burnishing block, a holder for the said block, means for vertically reciprocating the said holder, a vertical rod carried by the said holder, a link having a roller in engagement with the said rod, and means for reciprocating the said link and for thereby moving the said holder toward and from the article to be finished.

42. A device for finishing glassware comprising a burnishing block, a holder for the said block, a horizontally swinging member carrying the said holder and means for raising and lowering the said swinging member.

43. A device for finishing glassware comprising a burnishing block, a holder for the said block, the said holder being pivotally secured to the outer end of a horizontally swinging member, means for raising and lowering the said member, and means for adjusting the angular position of the said member.

44. A device for finishing glassware comprising a burnishing block, a holder for the said block, the said holder being pivotally carried at the outer end of a swinging member, means for adjusting the angular position of the said holder with respect to the said member, a vertically movable slide on which the end of the said member opposite to the said burnishing block is pivotally supported, a guide for the said slide, means for adjusting the angular position of the said guide, and means for raising and lowering the said slide.

45. A device for finishing glassware comprising a burnishing block, a holder for the said block, the said holder being pivotally carried at the outer end of a swinging member, means for adjusting the angular position of the said holder with respect to the said member, a vertically movable slide on which the end of the said member opposite to the said burnishing block is pivotally supported, a guide for the said slide, means for adjusting the angular position of the said guide, means for raising and lowering the said slide, a vertical rod carried by the said block holder, a forked link carrying a roller in engagement with the said rod between the said link and the said block holder, and means for periodically reciprocating the said link lengthwise, whereby the said block holder is moved toward and away from the article to be finished.

46. A fire-polishing and finishing machine comprising a ware-holding punty adapted to carry a glass article on its lower surface by adhesion and automatically operable means for striking the said punty and for thereby detaching the ware therefrom.

47. A fire-polishing and finishing machine comprising a ware-holding punty, a hammer disposed adjacent to the end of the said punty, and automatically operable means for causing the said hammer to strike a blow upon the end of the said punty and for thereby detaching the ware therefrom.

48. A fire-polishing and finishing machine comprising a ware holding punty and a knocking-off device comprising a hammer disposed adjacent to the end of the said punty and normally spaced therefrom, and automatically operable means for retracting the said hammer and for then releasing the said hammer, and a spring for thereupon causing the said hammer to strike a blow upon the end of the said punty.

49. A fire-polishing and finishing machine comprising a ware-holding punty and a knocking-off device comprising a hammer adjacent to the end of the said punty, a cam for retracting the said hammer and for then releasing the said hammer, and a spring for thereupon forcing the said hammer against the end of the said punty.

50. A knocking-off device for fire-polishing and finishing machines comprising a hammer adapted to strike a blow upon a ware carrying punty, a spring for normally holding the said hammer away from the said punty, a cam for retracting the said hammer and for then releasing the said hammer, a spring for thereupon causing the hammer to strike the said punty, and a weight for assisting the said striking spring.

51. A knocking-off device for fire-polishing and finishing machines comprising a hammer adapted to strike a blow upon a ware-carrying punty, a vertical rod carrying the said hammer, an arm having a bearing through which the said rod extends, a weight carried by the upper end of the said rod, a spring surrounding the said rod between the said weight and the said bearing, a second vertical rod having its upper end attached to the said arm, a bearing through which the said second rod extends, cushioning means between the said arm and the said second bearing, a cam engaging the lower end of the said second rod, and a spring connected to the said hammer-supporting arm and adapted to force the said hammer against the said punty when the said second rod is released by the said cam.

In testimony whereof, we, the said ANDREW J. SANFORD and JOHN B. TOWNSEND, have hereunto set our hands.

ANDREW J. SANFORD.
JOHN B. TOWNSEND.